(12) United States Patent
Pflaum

(10) Patent No.: US 8,803,445 B2
(45) Date of Patent: Aug. 12, 2014

(54) CIRCUIT AND METHOD FOR DRIVING LEDS

(75) Inventor: Bernd Pflaum, Unterhaching (DE)

(73) Assignee: Infineon Technologies Austria AG, Villach (AT)

( * ) Notice: Subject to any disclaimer, the term of this patent is extended or adjusted under 35 U.S.C. 154(b) by 153 days.

(21) Appl. No.: 13/607,266

(22) Filed: Sep. 7, 2012

(65) Prior Publication Data

US 2014/0070728 A1  Mar. 13, 2014

(51) Int. Cl.
*H05B 37/02* (2006.01)

(52) U.S. Cl.
USPC ............................. 315/307; 315/217; 315/297

(58) Field of Classification Search
USPC .................................. 315/307, 217, 291, 297
See application file for complete search history.

(56) References Cited

U.S. PATENT DOCUMENTS

| 8,093,835 | B2 * | 1/2012 | Godbole et al. | 315/307 |
|---|---|---|---|---|
| 8,129,916 | B2 * | 3/2012 | Godbole | 315/225 |
| 8,253,339 | B1 * | 8/2012 | Godbole et al. | 315/149 |
| 8,513,904 | B2 * | 8/2013 | Weng | 315/307 |
| 2012/0133295 | A1 | 5/2012 | Pereira et al. | |
| 2014/0028205 | A1 * | 1/2014 | Lischka | 315/193 |

FOREIGN PATENT DOCUMENTS

DE  10 2009 017 139 A1  10/2010
WO  WO 01/03474 A1  1/2001

OTHER PUBLICATIONS

Curtis, K., "Buck Configuration High-Power LED Driver," Microchip Technology, Inc., Application Note, AN874, DS00874C, 2006, 16 pages.

* cited by examiner

*Primary Examiner* — Daniel D Chang
(74) *Attorney, Agent, or Firm* — Slater & Matsil, L.L.P.

(57) ABSTRACT

A circuit for driving light emitting diodes includes a first semiconductor switch that is responsive to a driver signal and a freewheeling device coupled between a first supply terminal that provides a supply voltage and a second supply terminal that provides a reference potential. An LED and an inductor are coupled in series between a common circuit node of the first semiconductor switch and the freewheeling device and either the first supply terminal or the second supply terminal. A current measurement circuit is coupled to the LED and provides a load current signal that represents a load current passing through the at least one LED. A first feedback circuit includes an on-off controller that receives load current signal and a reference signal, compares the load current signal with the reference signal and generates the driver signal dependent on the comparison.

14 Claims, 11 Drawing Sheets

CIRCUIT AND METHOD FOR DRIVING LEDS

TECHNICAL FIELD

The present description relates to circuits and methods for driving light emitting diodes (LEDs), particularly to circuits and methods for driving LEDs with a load current that is regulated to keep the resulting perceivable brightness of the LEDs at a desired value.

BACKGROUND

Light emitting diodes have emerged in recent years as viable sources of light. Light emitting diodes, also called solid-state lighting devices or simply LEDs, are highly efficient, durable and long lasting lighting devices. The technology has improved enormously since the 1960s when the first LEDs came to market. LEDs are now the industry standard in a variety of specialty lighting markets and the popular bulbs are rapidly entering the general illumination market. LED bulbs are more energy efficient and last longer than, for example, incandescent, halogen and fluorescent bulbs. Advances in technology have provided LEDs that are typically four to five times more efficient than incandescent bulbs and have lifetimes exceeding tens of thousands of hours.

LEDs are current-driven devices, whose brightness is proportional to their average forward current (also referred to as their average load current). For this reason LEDs are usually driven using current source that provides a constant current. The constant-current source eliminates load current variations resulting from variations in the forward voltage of a LED and thus ensures a constant LED brightness. In known LED drivers, which are often implemented as switching converters such as buck, boost, or buck-boost converters, a plurality of components are integrated that evaluate voltages and compare those voltages to a reference voltage. Usually a power semiconductor switch (e.g., a MOSFET) is switched on and off in accordance with the results of this comparison, in order to charge or discharge an inductor.

The application note AN874, "Buck Configuration High-Power LED Driver," Microchip Technology, 2006, describes a switching power supply circuit that controls the load current supplied to an LED. However, during the delay time period that is needed to perform the measurements of the LED current and to activate the switch (e.g., due to propagation delays) in order to charge or discharge the inductor, the desired maximum value of the LED current is exceeded. This results in a mismatch between the desired average load current and the actual average load current supplied to the LED, which results in an undesired increase of brightness of the LEDs.

Although this mismatch may be considered during circuit design, the average load current supplied to the LED and thus the LED brightness itself will be different for different forward voltages (which are temperature-dependent) of the LED as well as for a different number of LEDs connected in series, and for different supply voltages applied to the LED and the LED driver. That is, common LED drivers—even when designed as current sources—are usually not able to keep the average load current constant (e.g., while the supply voltage or the LED forward voltages are varying or for different inductance values of the inductor) due to the delay time periods mentioned above. Thus, the LED drivers have to be reconfigured for each different situation.

A cost-efficient, but effective solution is needed that ensures (almost) constant brightness for different supply voltages or different LED forward voltages without the need of reconfiguring the circuit.

SUMMARY OF THE INVENTION

A circuit for driving light emitting diodes (LEDs) id described. In accordance with one example of the present invention the circuit includes a first semiconductor switch and a freewheeling device coupled in series between a first supply terminal that provides a supply voltage and a second supply terminal that provides a reference potential, wherein the first semiconductor switch is responsive to a driver signal. At least one LED and an inductor are coupled in series between a common circuit node of the first semiconductor switch and the freewheeling device and either the first supply terminal or the second supply terminal. A current measurement circuit is coupled to the LED and provides a load current signal which represents a load current passing through the at least one LED. A first feedback circuit includes an on-off controller that receives the load current signal and a reference signal, compares the load current signal with the reference signal, and generates the driver signal dependent on the comparison. A modulator provides, as reference signal, a modulated signal having a desired duty cycle and a peak value. Furthermore, a second feedback circuit receives the load current signal, determines an average load current signal and adjusts the peak value of the modulated reference signal supplied to the first feedback circuit dependent on the average load current signal and a reference value.

In accordance with another example of the present invention, the circuit includes a first semiconductor switch and a freewheeling device coupled in series between a first supply terminal that provides a supply voltage and a second supply terminal that provides a reference potential, wherein the first semiconductor switch is responsive to a driver signal. At least one LED and an inductor are coupled in series between a common circuit node of the first semiconductor switch and the freewheeling device and either the first supply terminal or the second supply terminal. A current measurement circuit is coupled to the LED and provides a load current signal which represents a load current passing through the at least one LED. A first feedback circuit includes an on-off controller that receives the load current signal and a reference signal, compares the load current signal with the reference signal, and generates the driver signal dependent on the comparison. A modulator provides, as reference signal, a modulated signal having a desired duty cycle and a peak value. Furthermore, a second feedback circuit is provided. The second feedback circuit includes a filter and a regulator. The filter receives the load current signal and provides a filtered signal representing the average load current. The regulator receives the filtered signal and, as a set point value, the reference value, determines a control signal dependent on the difference between the reference value and the filtered signal in accordance with a predefined control law, and adjusts the amplitude of the modulated reference signal in accordance with the control signal.

Furthermore, a LED driver for driving at least one LED is described. The LED driver may be coupled in series to an inductor between a driver output terminal and a first or a second supply terminal providing a supply voltage and a reference potential, respectively. According to one example of the invention, the LED driver includes a first semiconductor switch and a freewheeling device coupled in series between the first supply terminal, which provides the supply voltage, and the second supply terminal, which provides the reference potential. The first semiconductor switch is responsive to a driver signal. Furthermore, the common circuit node of the first semiconductor switch and the freewheeling device is connected to the output terminal. The LED driver further includes a current measurement circuit that is coupled to the LED and provides a load current signal which represents a load current passing through the at least one LED. A modulator provides, as reference signal, a modulated signal having a desired duty cycle and an amplitude.

A first feedback circuit includes an on-off controller that receives load current signal and a reference signal, compares the load current signal with the reference signal, and generates the driver signal dependent on the comparison. Furthermore, a second feedback circuit is provided. The second feedback circuit includes a filter and a regulator. The filter receives the load current signal and provides a filtered signal representing the average load current. The regulator receives the filtered signal and, as a set point value, the reference value, determines a control signal dependent on the difference between the reference value and the filtered signal in accordance with a predefined control law, and adjusts the amplitude of the modulated reference signal in accordance with the control signal.

Still further a method for driving an at least one LED is described. The at least one LED is coupled in series to an inductor between an output terminal and a first or a second supply terminal providing a supply voltage and a reference potential, respectively. In accordance with one example of the invention, the method comprises: measuring a load current passing through the at least one LED thus generating a load current signal which represents the load current; alternately applying either the supply voltage or the reference potential to the output terminal in accordance with a driver signal; comparing the load current signal with a reference signal and generating the driver signal dependent on the comparison; determining an average load current signal, from the load current signal; generating an on/off modulated input signal having an off-level, an on-level and a duty cycle; adjusting the on-level of the input signal dependent on the average load current signal and a reference value and providing the adjusted signal as reference signal.

BRIEF DESCRIPTION OF THE DRAWINGS

The invention can be better understood with reference to the following drawings and descriptions. The components in the figures are not necessarily to scale, instead emphasis is placed upon illustrating the principles of the invention. Moreover, in the figures, like reference numerals designate corresponding parts. In the drawings.

DETAILED DESCRIPTION OF ILLUSTRATIVE EMBODIMENTS

In the following detailed description, reference is made to the accompanying drawings, which form a part thereof, and in which are shown by way of illustration specific examples of how the invention may be practiced. In this regard, directional terminology, such as "top," "bottom," "front," "back," "leading," "trailing" etc., is used with reference to the orientation of the figures being described. Because components of exemplary embodiments can be positioned in a number of different orientations, the directional terminology is used for purposes of illustration and is in no way limiting. It is to be understood that other examples may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
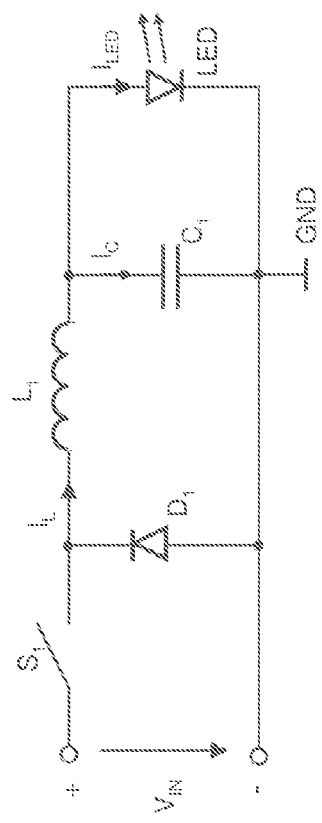
FIG. 1 illustrates an LED driver circuit in buck topology.

FIG. 1 illustrates a LED driver which includes a buck converter. In this driver circuit, a switch $S_1$ is coupled between a first supply terminal providing a supply voltage $V_{IN}$ and a first terminal of an inductor $L_1$. A diode $D_1$ is coupled between the common circuit node of the switch $S_1$ and the inductor $L_1$ and a second supply terminal, at which a reference potential GND is provided. The anode of the diode $D_1$ is thereby connected to the second supply terminal. An output capacitor $C_1$ is coupled between a second terminal of the inductor $L_1$ and the second supply terminal, at which the reference potential GND is provided. A load, which is an LED or a series circuit of several LEDs (also referred to as "LED chain"), is coupled in parallel to the capacitor $C_1$.

The buck converter is a voltage regulator that translates a high supply voltage $V_{IN}$ into a lower output voltage. This is accomplished by rapidly switching the inductor/capacitor (LC) network between the supply voltage and ground such that alternately either the supply voltage $V_{IN}$ or the reference potential (ground) GND is applied to the LC network. While the switch $S_1$ is closed, the inductor $L_1$ is connected to the input voltage $V_{IN}$, the LC circuit is in its "charging state," and an increasing inductor current flow $I_L$ passes from the first supply terminal (at which the input voltage $V_{IN}$ is applied) through the inductor $L_1$ to the parallel circuit composed of the output capacitor $C_1$ and the LED(s).

Figure 2:
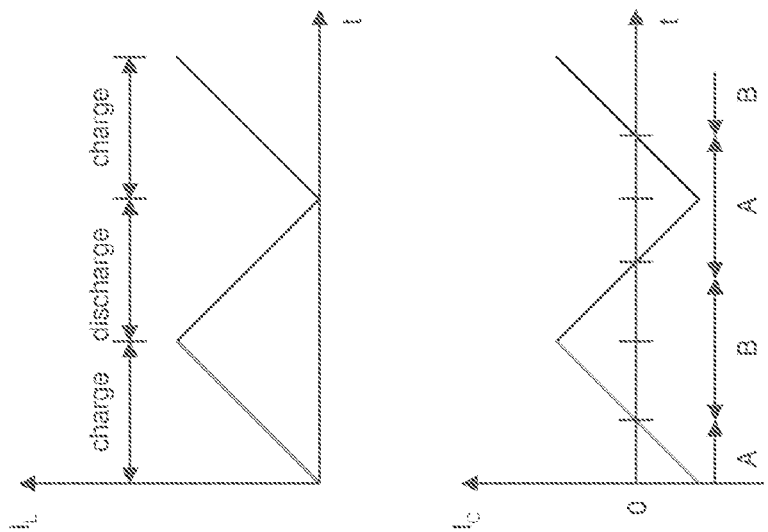
FIG. 2 illustrates characteristics of currents within the circuit of FIG. 1.

While the charging current $I_L$ is flowing through the inductor $L_1$ to the LED(s), part of its energy is stored in the inductor $L_1$ as a magnetic field. When the switch $S_1$ is (re)opened, the circuit enters its "discharge state" and the magnetic field of the inductor $L_1$ collapses, while the current flow to the LED(s) continues. When the inductor current $I_L$ drops to zero, the switch $S_1$ is closed again and the charge/discharge cycle starts over. The result of this switching cycle is an inductor current $I_L$ that ramps up and down over the course of a cycle, as shown in FIG. 2.

The capacitor $C_1$ in the LC network acts to smooth the inductor current $I_L$ into a DC current flow to the LED(s). When the inductor current $I_L$ is greater than the load current $I_{LED}$, the load current $I_{LED}$ is supplied by the inductor current $I_L$ and any surplus current $I_C$ flows into the capacitor $C_1$ thereby charging it. In FIG. 2 this is shown as phase B in the timing diagram illustrating the capacitor current $I_C$ over time. When the inductor current $I_L$ falls below the load current requirement, the current flow $I_C$ through the capacitor $C_1$ reverses and the capacitor current $I_C$ supplements the inductor current $I_L$ to make up the difference between the inductor current $I_L$ and the required load current $I_{LED}$. In FIG. 2 this is shown as phase A in the timing diagram illustrating the capacitor current $I_C$.

A feedback circuit is usually implemented to regulate the output current (i.e., the load current $i_{LED}$) supplied to the load by the switching converter. Such a feedback circuit monitors the load current $I_{LED}$ and compares it to a stable reference. Based on the result of the comparison, the circuit adjusts the duty cycle of the switching operation to compensate for any discrepancies. The feedback circuit compensates for any variations of the load voltage resulting from component or timing tolerances and it adjusts the duty cycle to compensate for changes in the input voltage $V_{IN}$ to keep the load current $I_{LED}$ at its desired level.

One switching power supply design concept is the idea of distinguishing between continuous versus discontinuous inductor current $I_L$. In one mode of operation which is usually referred to as "discontinuous current mode" (short: DCM), the inductor current $I_L$ drops to zero at the end of each discharge cycle as described above and remains zero for a finite time period. However, in another mode of operation which is usually referred to as "continuous current mode" (short: CCM), the inductor current $I_L$ does not drop to zero. Instead, the inductor $L_1$ maintains a DC current component throughout the switching cycle.

The resulting inductor current $I_L$ has both AC and DC components to its waveform. The DC component equals the average current flow $I_{AVG}$ during the switching cycle and is determined by a reference voltage $V_{DRIVE}$. The AC component is a triangular shaped waveform superimposed on the DC component $I_{AVG}$ and is caused by the switching action of the driver circuit (i.e., the switching converter). The advantage of a CCM operation is that the inductor current $I_L$ flows to the output continuously, which reduces the charge storing requirements on the capacitor $C_1$.

Figure 3:
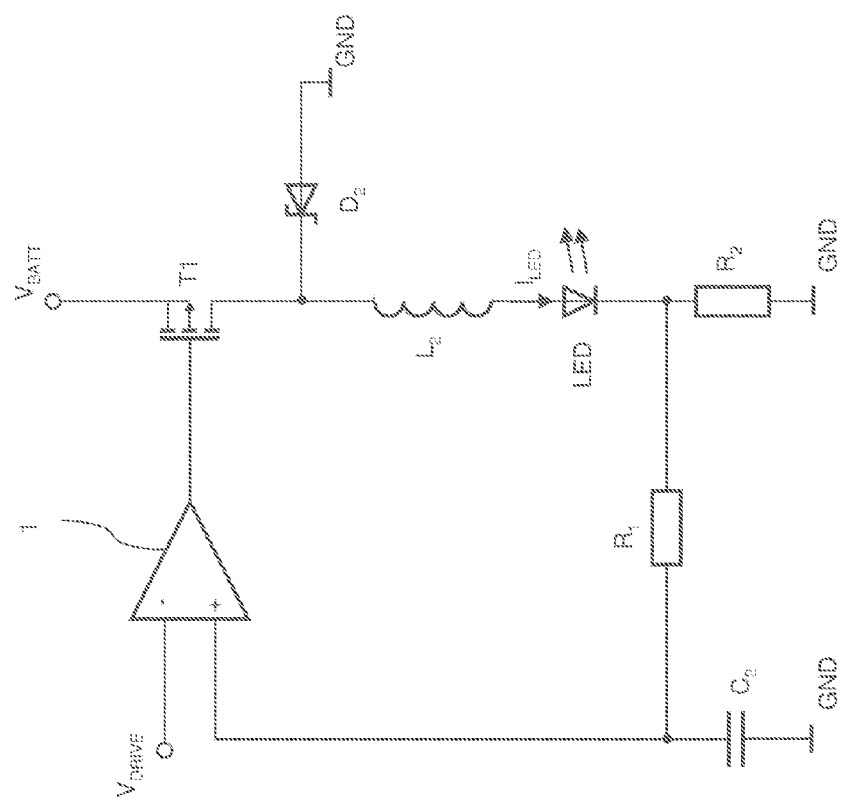
FIG. 3 illustrates an LED current control circuit in buck configuration.

The driver circuit shown in FIG. 3 takes advantage of the DC component $I_{AVG}$ of the inductor current $I_L$ in a switching converter operating in CCM. A switching transistor $T_1$, an inductor $L_2$, a LED (which may also be regarded as representing a LED chain) and a current measurement resistor $R_2$ (shunt resistor) are coupled in series between a first supply terminal, which provides the supply potential $V_{BATT}$, and a second supply terminal, which provides a reference potential GND (e.g., ground). The load current-path (e.g., drain-source current-path in case of a MOSFET) of transistor $T_1$ is coupled between the first supply terminal for supply potential $V_{BATT}$ and the inductor $L_2$. The inductor $L_2$ is coupled between the load current-path of the transistor $T_1$ and the LED. The LED is coupled to the inductance $L_2$ with its anode. The current measurement resistor $R_2$ is coupled between the cathode of the LED and the second supply terminal for reference potential GND.

A diode $D_2$, which may be a Schottky diode, is coupled between the common circuit node of the transistor $T_1$ and the inductor $L_2$ and the second supply (GND). It should be noted that the diode $D_2$ operates as a freewheeling diode and may be replaced by a second transistor (e.g., a MOSFET). In this case the two transistors would form a transistor half-bridge. A resistor $R_1$ is coupled between the common circuit node of the LED and the current measurement resistor $R_2$ and a first (non-inverting) input terminal of a comparator 1. A further capacitor $C_2$ is coupled between the common circuit node of the comparator 1 and the resistor $R_1$ and the second supply terminal (GND). The output of comparator 1 is coupled to the control terminal (i.e., the gate terminal in case of a MOSFET) of the transistor $T_1$. At its second (inverting) input terminal, the comparator 1 receives the reference voltage $V_{DRIVE}$.

When analysing the circuit of FIG. 3 one can see that the capacitor $C_2$ and the resistor $R_1$ form an RC low-pass filter. This filter receives, at its input, a voltage signal $i_L \cdot R_2$ (i.e., the voltage drop across the current measurement resistor $R_2$), which is proportional to the inductor current $i_L$, and provides, as an output signal, a voltage $V_{AVG}$ which represents the average inductor current $i_{AVG}$. The comparator 1 thus essentially compares a signal representing the average inductor current with a corresponding reference signal. The comparator 1 may have a hysteresis. That is, the comparator 1 triggers a switch-off of the transistor $T_1$ when the average inductor current rises above a first threshold and triggers a switch-on of the transistor $T_1$ when the average inductor current falls below a second threshold which is lower than the first threshold. In this regard the comparator 1 operates as a bang-bang controller (on-off controller).

Apart from the feedback circuit (including resistor $R_1$, capacitor $C_2$, comparator 1) and the current measurement resistor $R_2$ the circuit of FIG. 3 is essentially the same as the previous example illustrated in FIG. 1. However, the output capacitor $C_1$ (see FIG. 1) is not required in the example of FIG. 3. The buck converter circuit illustrated in FIG. 3 thus has a similar charge/discharge cycle as the buck converter of FIG. 1. The charging state of the switching cycle is initiated by switching on the transistor $T_1$. This results in an increasing current flow from the supply terminal ($V_{BATT}$) through the transistor $T_1$, the inductor $L_2$, the LED and the shunt resistor $R_2$. When the voltage across the capacitor $C_2$ (which represents the average inductor current) exceeds the reference voltage $V_{DRIVE}$ supplied to the comparator 1, then the comparator 1 switches off the transistor $T_1$ thus initiating the discharge state of the circuit.

Figure 4:
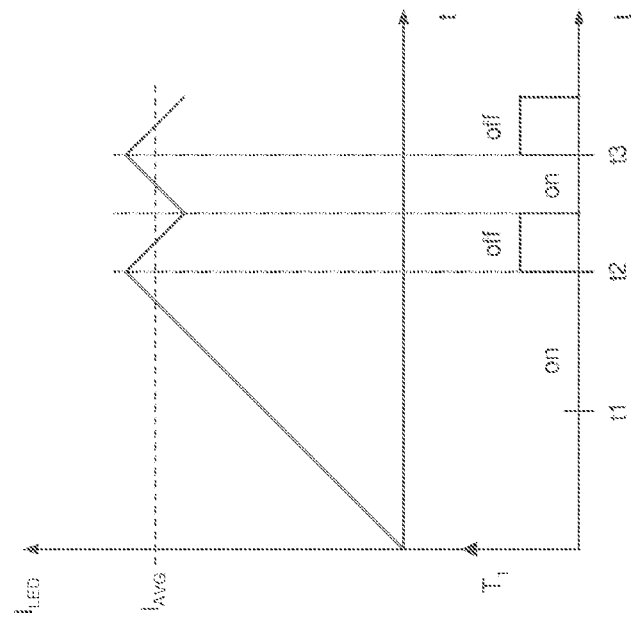
FIG. 4 illustrates the characteristics of the LED current and the switching state of a switch within the circuit of FIG. 3.

In the discharge state, current flows through the freewheeling diode $D_2$, the inductor $L_2$ and the resistor $R_2$. The inductor current $I_L$ ramps down until the voltage across the capacitor $C_2$ (representing the average inductor current) drops below the reference voltage $V_{DRIVE}$. As a consequence, the transistor $T_1$ is switched on again and the next cycle begins. The resulting current flow $I_{LED}$ through the LED and the inductor is a DC level $I_{AVG}$ superposed with a small triangular AC "ripple" current that is synchronous to the charge/discharge cycle. This situation is shown in FIG. 4. The AC component of the current $I_{LED}$ around its mean value $I_{AVG}$ is common to all known switching regulators. For circuits including LED dimming capability the reference voltage $V_{DRIVE}$ can be an on/off modulated DC voltage. For example, pulse width modulation may be used and the duty cycle of the modulated reference voltage represents the dim value. For example, a duty cycle of 50 percent reduces the brightness by one half of the maximum brightness, which would correspond to a duty cycle of 100 percent.

FIG. 4 shows the load current $I_{LED}$ through the LED (which is equal to the inductor current) and the resulting switching states of the transistor $T_1$. Although a feedback circuit, which regulates the average load current $I_{AVG}$, is provided, the load current $I_{LED}$ is still different for different supply voltages $V_{BATT}$ as well as for different inductances of the inductor $L_2$ and different forward voltages of the LED. This is mainly a result of the delay which elapses between a transition (e.g., from a low level to a high level or vice versa) in the comparator output signal and the actual switching operation of the transistor $T_1$. During this delay time period a transient overshot of the inductor current occurs. That is, the peak level of the AC component of the inductor current is higher than it would be if the delay was zero. The higher the voltage applied to the inductor, the higher the overshot for a given delay time. Similarly, the lower the inductance, the higher the overshot for a given delay time. As the delay times are not equal for activating and deactivating the transistor $T_1$, the overshot is higher for the upper peak of the inductor current and, as a result, the average value of the inductor current is different for different inductor values as well as for different supply voltages $V_{BATT}$. A varying average inductor current can be perceived as a varying brightness of the LED. That is, the brightness of the LED depends on the supply voltage in an undesired manner. The feedback circuit of the LED driver circuit of FIG. 3 is not able to compensate for this effect and thus, a variation of the supply voltage $V_{BATT}$ entails a corresponding brightness variation. Also when LED dimming is active (by applying a modulated reference voltage, see FIG. 3) the same problem occurs during the on-periods of the reference voltage.

Figure 5A:
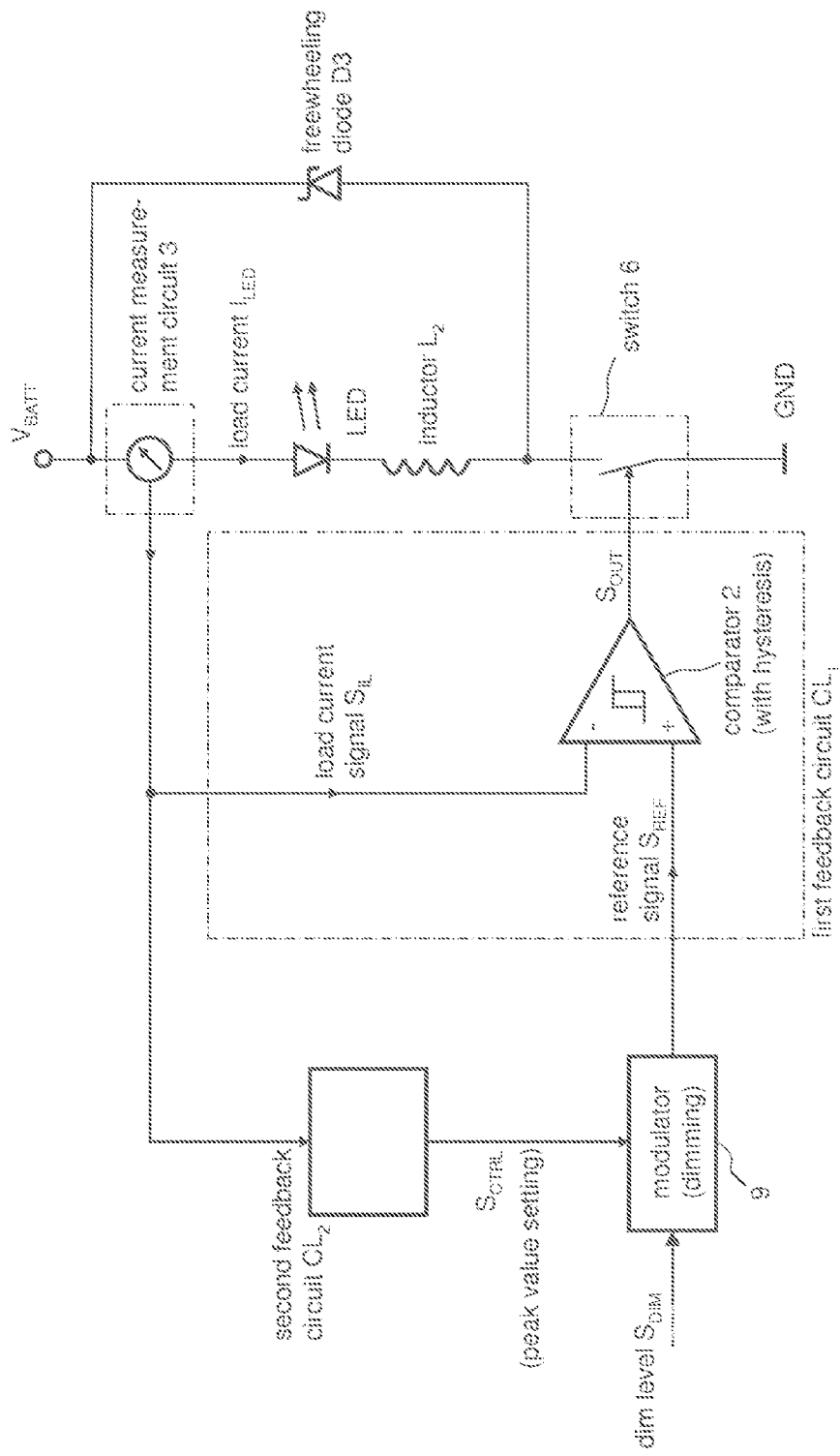
FIG. 5 is a illustrates three (FIGS. 5*a*, 5*b*, and 5*c*) different examples of a LED driver circuit.

FIG. 5 illustrates some exemplary circuits which are capable of compensating for the undesired effect mentioned above. FIG. 5a illustrates a first exemplary circuit that keeps the mean value $I_{AVG}$ of the LED current $I_{FED}$ constant or at least significantly reduces brightness variations resulting from variations of the supply voltage $V_{BATT}$. In the context of the present example the "mean value" is seen as a short-term average occurring during the on-periods of the (modulated) reference signal $S_{REF}$. That is, the short-term average $I_{AVG}$ of the LED current $I_{LED}$ is the average current passing through the LED during the on-periods of the reference signal, whereas the long-term average of the LED current may be significantly lower in accordance with the duty cycle of the reference signal.

The circuit of FIG. 5a is similar to the circuit of FIG. 3. However, the semiconductor switch 6 is a low-side switch, whereas the transistor $T_1$ is a high-side switch in the example of FIG. 3. In the present example the low-side switch 6 is connected in series to the inductor $L_2$ and the LED (representing a single LED or a LED chain including any appropriate number of LEDs). The series circuit of switch 6, LED, and inductor $L_2$ is coupled between a first supply terminal that is provided with the supply voltage $V_{BATT}$ (e.g., the battery voltage of an automotive battery) and a second supply terminal which is at a reference potential GND (e.g., ground). The order of inductor $L_2$ and LED may be interchanged. A current measurement circuit 3 may be coupled to the series circuit (composed of switch 6, LED, and inductor $L_2$) such that it measures the load current $i_{LED}$ supplied to the LED. In the present configuration load current $i_{FED}$ and inductor current $i_L$ are equal. The current measurement circuit 3 generates a load current signal $S_{IL}$ which represents the load current $i_L$. Many appropriate current measurement circuits are known in the field and one exemplary current measurement circuit is explained later with reference to FIG. 5c. The semiconductor switch 6 can be switched on and off by applying an appropriate driver signal $S_{OUT}$ to a respective control signal of the switch 6. If a MOSFET is used as semiconductor switch, the driver signal $S_{OUT}$ may be a gate current or a gate voltage that is sufficient to activate (switch on) or deactivate (switch off) the switch 6.

The driver signal is generated by a comparator 2 (similar to the example of FIG. 3) which is supplied with the load current signal $S_{IL}$ and a reference signal $S_{REF}$ which is an on/off modulated signal generated by a modulator 9 in accordance with a desired dim level $S_{DIM}$. The comparator 2 has a hysteresis and generates a high-level output signal $S_{OUT}$ (for activating the switch 6) when the difference $S_{REF}$-$S_{IL}$ exceeds a first threshold. Analogously, it generates a low-level output signal $S_{OUT}$ (for deactivating the switch 6) when the difference $S_{REF}$-$S_{IL}$ falls below a second threshold. The two thresholds typically are equal in magnitude but have opposite signs. In an ideal case (without any propagation delays as discussed above) the actual load current $I_{LED}$ varies around an average on-current $I_{AVG}$ that corresponds to the reference signal $S_{REF}$ while the reference signal is non-zero (i.e., during on-periods of the reference signal). The superposed AC component (also referred to as "ripple current") has a substantial triangular-shaped waveform and a peak-to-peak amplitude dependent on the hysteresis of the comparator 2. As elaborated above, the delay between a transition of the driver signal $S_{OUT}$ and the corresponding switching operation of the switch 6 may lead to a systematic error resulting in a positive deviation $\Delta I$ of the actual average load current $I_{AVG}$=$I_{REF}$+$\Delta I$ wherein $I_{REF}$ is the "ideal" average load current corresponding to the reference signal $S_{REF}$ and the deviation $\Delta I$ is dependent—inter alia—on the supply voltage $V_{BATT}$. Generally, the comparator 2 is part of a first feedback circuit $CL_1$, wherein the comparator 2, in essence, implements an on-off controller (also referred to as bang-bang-controller) to regulate the load current $i_L$. The reference signal is the reference input (set point value) for the on-off controller of the first feedback circuit $CL_1$.

The modulator 9 generates the reference signal $S_{REF}$ which is on/off-modulated in accordance with a desired dim level $S_{DIM}$. For example, pulse width modulation (PWM) may be used. However, pulse frequency modulation (PFM) and pulse density modulation (PDM, also referred to as sigma-delta modulation), random on/off modulation and other modulation schemes may be applicable too. According to the desired dim level $S_{DIM}$ (which may be, e.g., a digital number or an analog signal) the modulator 9 sets the duty cycle (usually expressed in percent) of the modulation. In this context a duty cycle of, e.g., 40 percent means that the reference signal is at its off-level (e.g., zero volts in case of a voltage signal) for 60 percent of time on average and at its on-level (peak level, e.g., 5 volts) for 40 percent of time on average, wherein on-periods and off-periods alternate. The switch 6 is switched off throughout each off-period of the reference signal $S_{REF}$, whereas the switch 6 alternately switches on and off in accordance with the comparator output signal (driver signal $S_{OUT}$) throughout the on-periods of the reference signal $S_{REF}$. Thereby the average on-current $I_{AVG}$ corresponds to the on-level of the reference signal $S_{REF}$. It should be kept in mind that the on-periods and off-periods of the reference signal $S_{REF}$ are usually in the range of 0.1 or a few milliseconds (e.g., PWM with a carrier frequency of 10000 kHz or more), whereas the switching operation of the switch 6 during an on-period has a cycle period in the range of a few microseconds (e.g., switching frequency in the range of 100 kHz up to a few MHz).

To compensate for the adverse effect of the delay times discussed above, a second feedback circuit $CL_2$ (control loop) is provided. The second feedback circuit receives, as an input signal, the load current signal $S_{IL}$ and adjusts the amplitude (i.e., the peak level) of the (modulated) reference signal $S_{REF}$ for the first feedback circuit $CL_1$. According to the control law implemented by the second feedback circuit $CL_2$ the reference signal $S_{REF}$ represents the difference between an average load current value $I_{AVG}$ and a preset constant value. One exemplary implementation of the second feedback circuit is discussed later with reference to FIG. 5c.

The operation of the second feedback circuit $CL_2$ and its effect can be summarized as follows: When—during on-periods of the reference signal $S_{REF}$—the actual (short-term) average $I_{AVG}$ of the load current $i_{LED}$ changes in response to a change of the supply voltage $V_{BATT}$ (due to the adverse effect of the delay times explained above) the second feedback loop $CL_2$ counteracts this change of the average load current $I_{AVG}$ by adjusting the on-level (peak level) of the modulated reference signal $S_{REF}$ (i.e., the set point value) for the first feedback circuit. When the average load current begins to rise in response to a rising supply voltage $V_{BATT}$, the second feedback circuit $CL_2$ reduces the on-level of the reference signal $S_{REF}$ (i.e., the set point value) supplied to the first feedback circuit $CL_1$ thus compensating for the effect of the rising supply voltage $V_{BATT}$. For the same reason, the brightness of the LED will not be constant for different inductance values of the inductor $L_2$ and for different forward voltages of the LED(s).

Figure 5B:
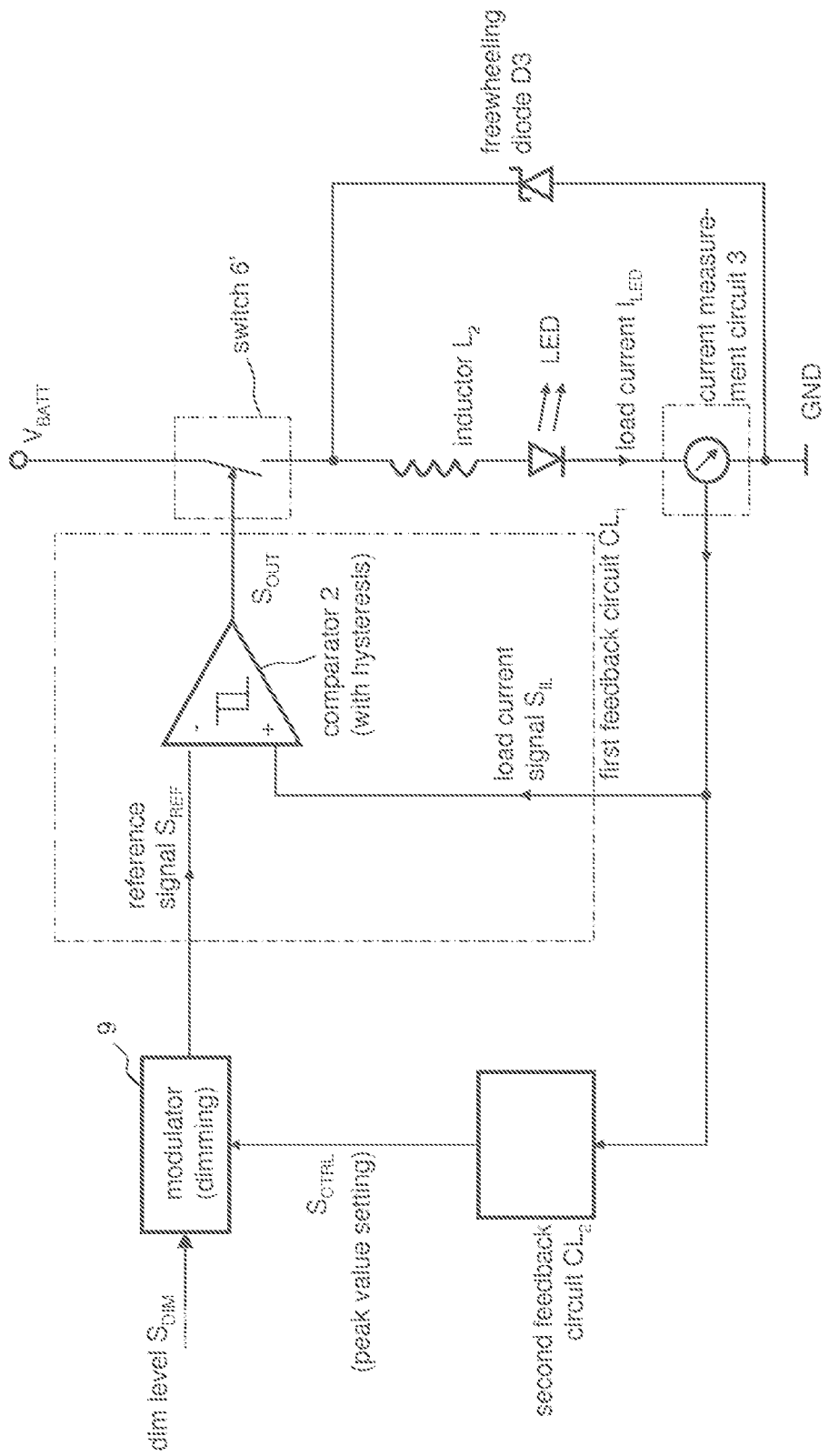

The example of FIG. 5b is almost identical to the circuit depicted in FIG. 5a. The only difference is, that the power semiconductor switch 6 is a high-side switch instead of a low-side switch (as it is in FIG. 5a). In this case the current measurement may be accomplished at the low-side. The freewheeling diode D3 is coupled between the common circuit node of the inductor $L_2$ and the switch 6 and the reference potential GND (and not to supply potential $V_{BATT}$ as in FIG. 5a). The operation of the LED driver circuit of FIG. 5b is the same as the operation of the LED driver circuit of FIG. 5a.

Figure 5C:
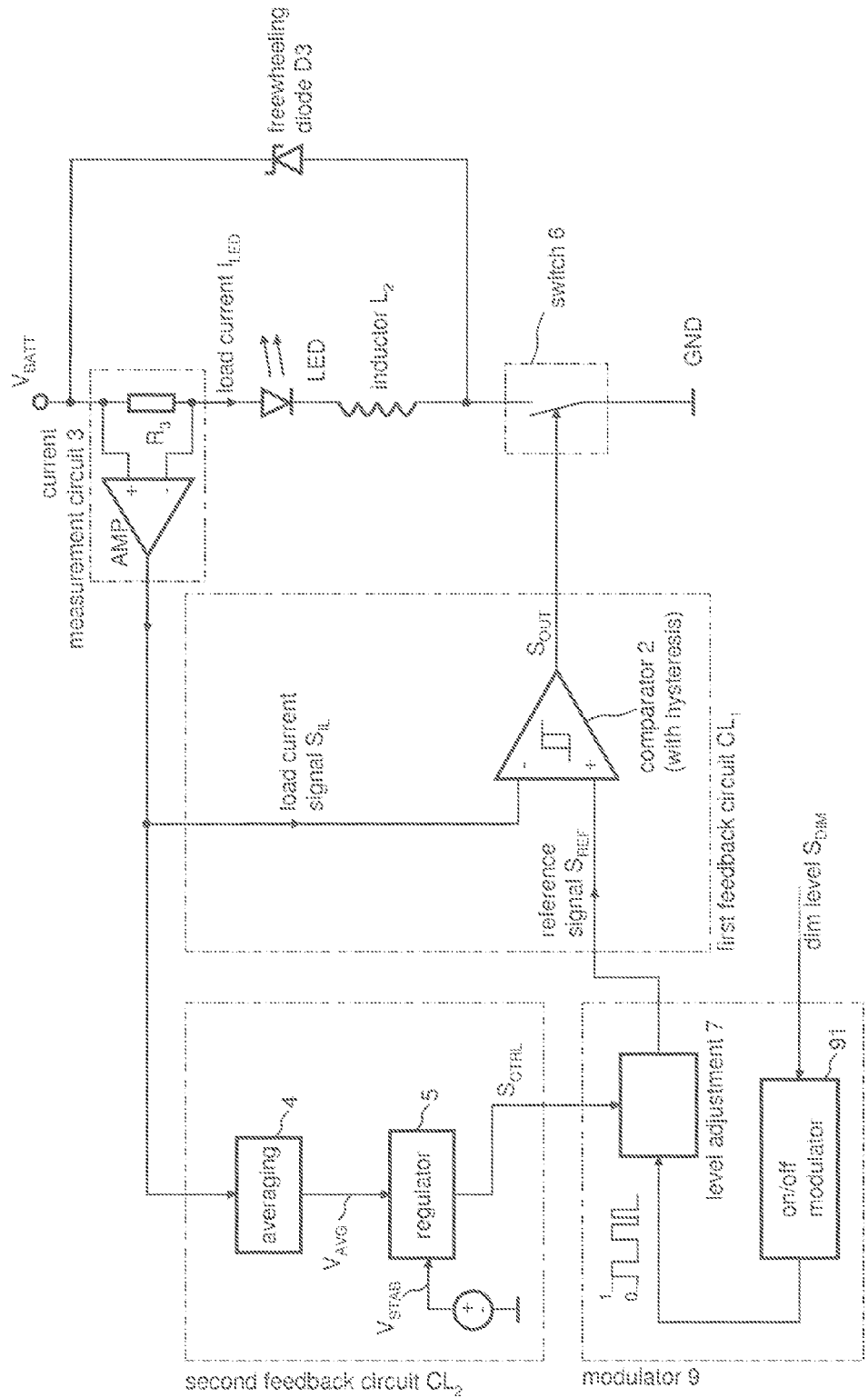

FIG. 5c essentially illustrates the same LED driver circuit as shown in FIG. 5a. However, the second feedback circuit $CL_2$ and the current measurement circuit 3 are illustrated in more detail. Similar to the previous examples, the low-side switch 6 is connected in series to the inductor $L_2$ and the LED, which may be replaced by a LED chain. The series circuit of switch 6, LED, and inductor $L_2$ is coupled between a first supply terminal (supply voltage $V_{BATT}$) and a second supply terminal (e.g., ground GND). The order of inductor $L_2$ and LED may be interchanged. The current measurement circuit 3 includes a shunt resistor $R_3$, which is coupled in series to the LED such that the load current $i_{LED}$ also passes the shunt resistor and the voltage drop $R_3 \cdot I_{LED}$ across the shunt resistor $R_3$ is proportional to the load current $I_{LED}$ (or the inductor current $I_L = I_{LED}$). The voltage drop $R_3 \cdot I_{LED}$ across the shunt resistor $R_3$ may be supplied to an amplifier AMP which amplifies the voltage drop and generates a respective load current signal $S_{IL}$ which represents the load current $i_L$. The amplifier AMP may be, e.g., a simple differential amplifier, an operational amplifier, a transconductance amplifier or any other appropriate amplifying circuit. The current signal $S_{IL}$ may be a voltage signal or, alternatively, a current signal dependent on the actual implementation. The semiconductor switch 6 can be switched on and off by applying an appropriate driver signal $S_{OUT}$ to a respective control signal of the switch 6 (e.g., a gate signal when using a MOSFET as a power semiconductor switch).

The first feedback circuit receives, as input signal, the load current signal $S_{IL}$ as well as the modulated reference signal $S_{REF}$, whose on-level (i.e., peak level or amplitude) can be regarded as a set point value for the on-off controller which is implemented by the comparator 2 as mentioned above. The comparator 2 receives the reference signal $S_{REF}$ and the load current signal $S_{IL}$ and generates an output signal $S_{OUT}$ for driving the power semiconductor switch 6 as explained above with reference to FIG. 5a. The operation of the first feedback circuit $CL_1$ is entirely the same as in the example of FIG. 5a and is therefore not repeated here. The waveform of the load current $i_{LED}$ and the switching operation of the switch 6 correspond to the timing diagrams illustrated in FIG. 4 while the reference signal $S_{REF}$ is on (i.e., throughout an on-period).

To maintain the actual (short-term) average $I_{AVG}$ of the load current $I_{LED}$ at a constant level while the supply voltage $V_{BATT}$ (or the temperature-dependent forward voltage of the LED) changes, the second feedback circuit $CL_2$ regulates the on-level of the reference signal $S_{REF}$ and thus the set point value for the first feedback circuit $CL_1$. As mentioned above, the control law implemented by the second feedback circuit $CL_2$ ensures that the on-level of the reference signal $S_{REF}$ is adjusted dependent on the difference between an average load current value $I_{AVG}$ and a preset constant value (e.g., a stabilized voltage $V_{STAB}$). For this purpose, the second feedback circuit $CL_2$ includes a filter 4 circuit which receives, as input signal, the load current signal $S_{IL}$ and provides, as output signal, a filtered signal $V_{AVG}$ which can be regarded as a signal representing the (e.g., moving) average load current $I_{AVG}$. The filter may be, for example a passive RC filter composed of a resistor and a capacitor. Alternatively, the load current signal $S_{IL}$ may be digitized using any suitable analog-to-digital converter. In this case, the filter 4 may be implemented as a digital filter using a digital signal processor and appropriate software. Not only the filter 4, but the whole second feedback circuit $CL_2$ (and even parts of the first feedback circuit $CL_1$) may be digitally implemented using an appropriately programmed signal processor. In this case the entities here referred to as circuits can be seen as software-implemented functional units.

The filter output signal $V_{AVG}$ (that represents the average load current $I_{AVG}$) as well as a stabilized reference value (e.g., a stabilized reference voltage or, in digital implementations, a register value) are supplied to the regulator 5. The regulator 5 may be, in a simple example, a P-controller. However, the regulator 5 may be also be a PI-, PID-, or PT1-controller or something similar. Generally, the controller 5 may be configured to minimize or at least reduce any offset $V_{STAB}-V_{AVG}$ between average load current (represented by signal $V_{AVG}$) and the reference value $V_{STAB}$. Regulators having an I-component such as a PI-controller may achieve a steady state control offset of zero.

Figure 9:
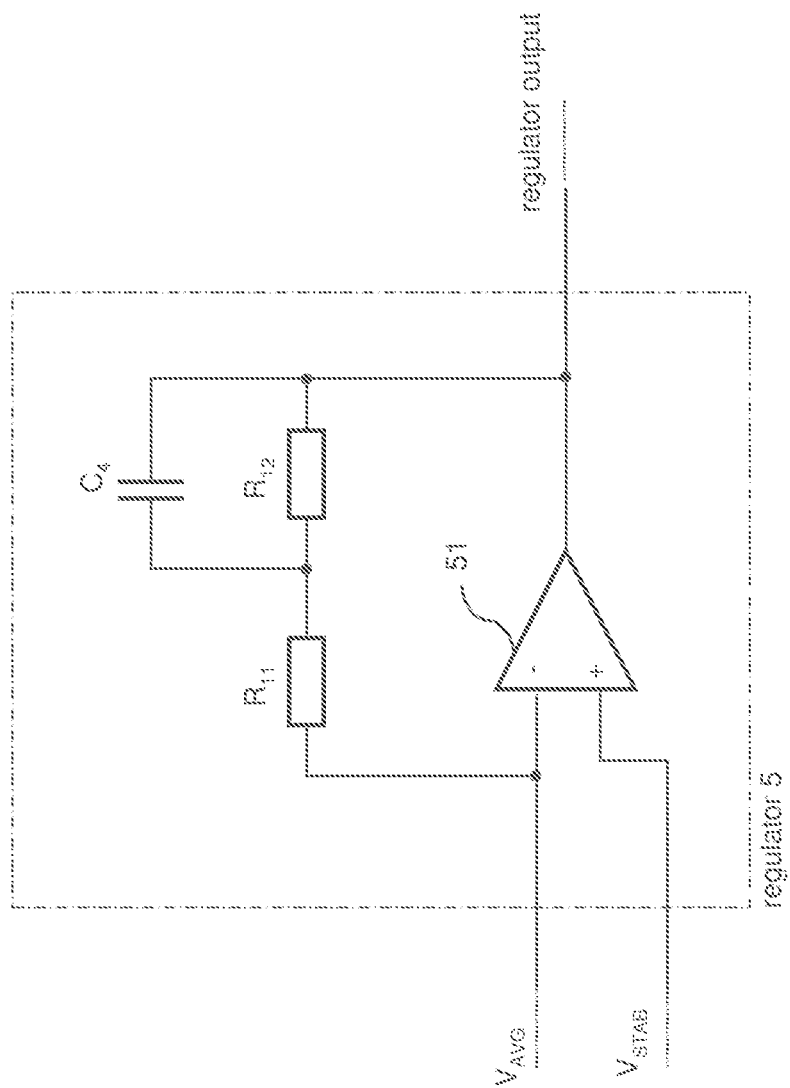
FIG. 9 illustrates one example of a controller that may be used in the LED driver circuits described herein.

The regulator 5 may include an operational amplifier 51. Depending on the type (P, PI, PIC, PT1, etc.) of regulator 5 that is used, different components are needed to set up the regulator 5. In case of a PT1-controller, for example, the operational amplifier 51 receives the reference value $V_{STAB}$ at its inverting input terminal. A first resistor $R_{11}$ and a parallel circuit of a second resistor $R_{12}$ and a capacitor $C_4$ are coupled in series between the inverting input terminal and the output terminal of the operational amplifier 51. An example of such a regulator 5 is shown in FIG. 9. In some exemplary embodiments it may be advantageous to use a PT1-controller. However, in other examples other types of controllers 5 may be used. In such cases, other components in different configurations are needed to implement the respective controller types.

The offset $V_{STAB}-V_{AVG}$ may be amplified and modified within the regulator 5 and the regulator output signal may be directly supplied to the modulator circuit 9. The modulator circuit 9 may comprise a level adjusting circuit 7 which receives the regulator output signal as well as an on/off modulated signal of a defined amplitude and subject the modulated signal to a level adjustment in accordance with the regulator output signal. The level adjusted modulated signal is supplied to the first feedback circuit $CL_1$ as reference signal $S_{REF}$. The circuit 7 may be configured to modify the amplitude (on-level) of the reference signal $S_{REF}$, which is the set point value for the first feedback circuit $CL_1$, i.e., for the on-off controller 2 during on-periods of the reference signal $S_{REF}$. The circuit 7 may simply perform a kind of level shift. Examples of the circuit 7 are discussed later.

Figure 6:
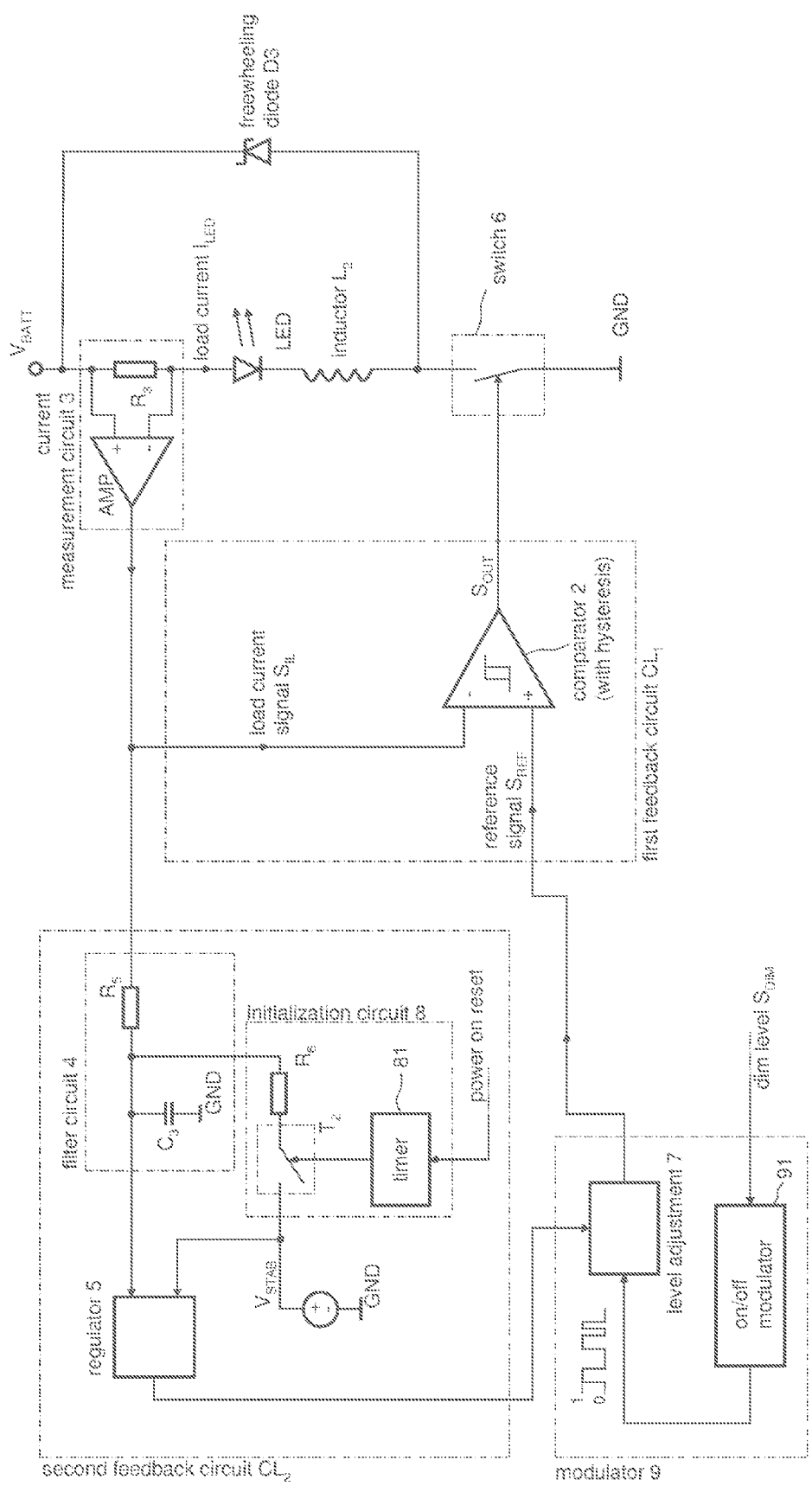
FIG. 6 illustrates another exemplary LED driver circuit with an improved power-on behaviour.

FIG. 6 illustrates another exemplary circuit for maintaining the average load current $I_{AVG}$ at a desired level independent from the supply voltage $V_{BATT}$. The circuit generally corresponds to the circuits shown in FIGS. 5a and 5c. The filter 4 (averaging circuit), however, is illustrated in more detail. The filter 4 may include, e.g., a passive first order RC low pass filter, which is formed by a resistor $R_5$ and a capacitor $C_3$. Other filter types (e.g., higher order filters, digital filter) may also be applicable.

To avoid undesired transient effects during start-up (after powering on the circuit) an initialization circuit 8 may be used to set the filter output of the filter 4 to an initial value at or close to the desired value given by the stabilized reference value $V_{STAB}$. In the simple (and thus very cost-efficient and suitable for low-cost applications) implementation implemented in the example of FIG. 6, the initialization circuit 8 quickly pre-charges the capacitor $C_3$, which is connected to the filter output, directly after powering on the LED driver circuit. This may be accomplished by temporarily connecting the stabilized reference voltage $V_{STAB}$ to the capacitor via a semiconductor switch $T_2$. The switch $T_2$ may be closed for a defined (e.g., fixed) time period. Closing and reopening the switch may be controlled using a timer circuit 81, which may be, for example, a timer circuit (e.g., a monoflop) which generates a pulse of a defined length in response to a power-on signal.

In the example depicted in FIG. 6 a first terminal of the semiconductor switch $T_2$ (e.g., a MOSFET or a BJT) is connected to the common circuit node between the resistor $R_5$ and the capacitor $C_3$ via a further resistor $R_6$ (optional). A second terminal of the semiconductor switch $T_2$ is coupled to the voltage source providing the stabilized voltage value $V_{STAB}$. However, any other voltage value may be also used as an initial value, e.g., 90 percent of $V_{STAB}$. A control input (in case of a MOSFET the gate, in case of a BJT the base terminal) of the switch $T_2$ is connected to timer circuit 81 mentioned above. If the timer unit is implemented as a monoflop then it maintains a defined voltage at the capacitance $C_3$ for a certain time, thus initializing the filter output to a desired initial value. The time delay unit 81 may be triggered by a power-on reset signal, for example. This power-on reset signal may be available once, at power-on of the system.

Figure 7:
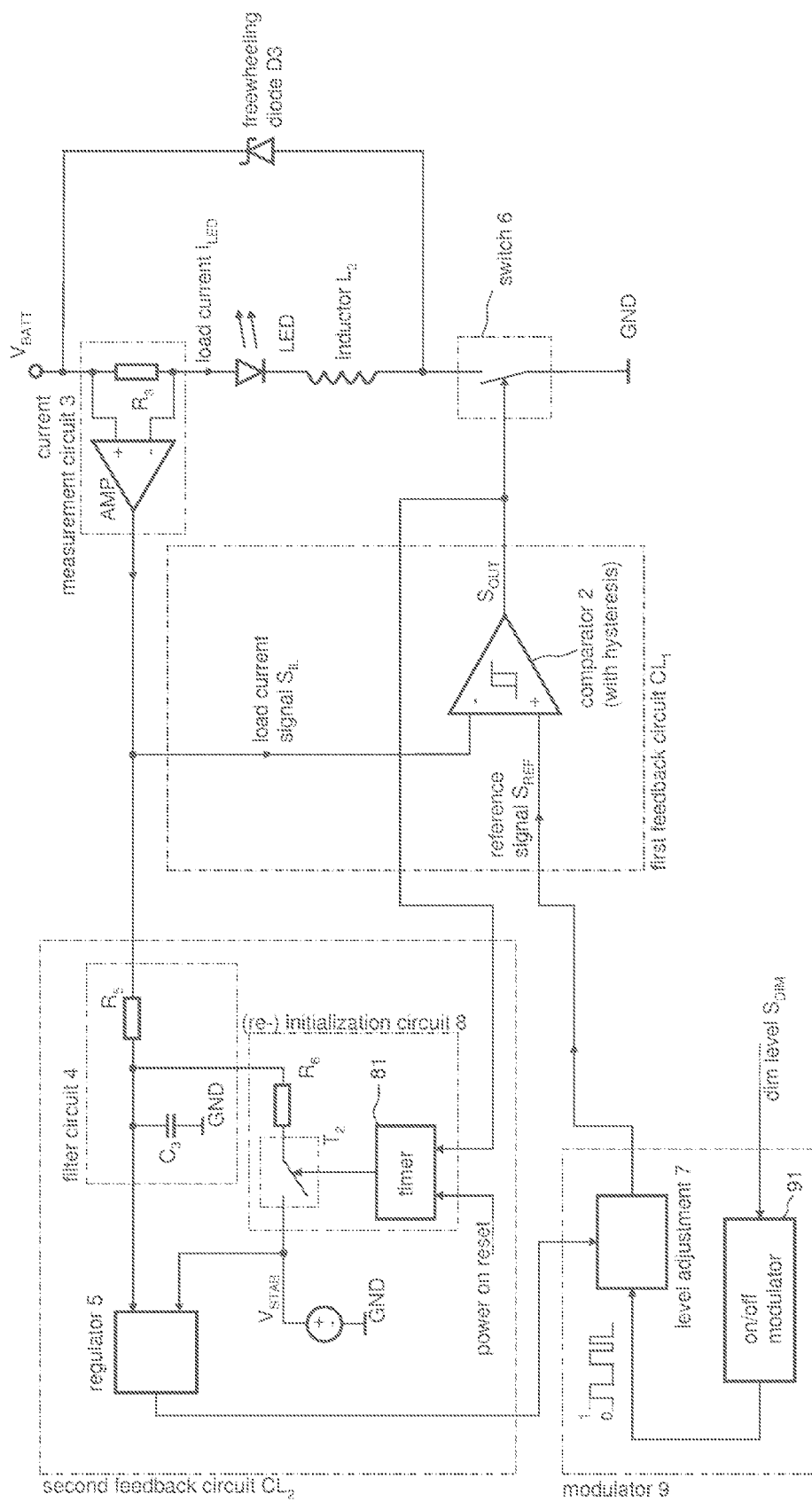
FIG. 7 illustrates another exemplary LED driver circuit similar to the example of FIG. 6.

The example illustrated in FIG. 7 is very similar to the previous example of FIG. 6. The only difference is the implementation of the timer circuit 81. In the present example the timer circuit 81 is also responsive to the driver signal $S_{OUT}$ that triggers the activation and deactivation of the power semiconductor switch 6. In the present example the timer circuit triggers a re-initialization (e.g., by activating the switch $T_2$ for a fixed time period) in response to a switch-on of the power semiconductor switch 6, but only when the switch 6 has been off for a defined time. That is, a re-initialization is not triggered during the "normal" switching operation of switch 6 during on-periods of the reference signal $S_{REF}$ but rather only at the end of an off-period throughout which the switch 6 is off. That is, when the switching operation of the power semiconductor switch 6 is temporarily paused (e.g., for dimming purposes) for a defined minimum time, a re-initialization is triggered when the normal switching operation of switch 6 resumes.

The LED driver circuits depicted in FIGS. 6 and 7 are configured to clamp the voltage across the capacitor $C_3$ of the filter 4—and thus the filter output signal $V_{AVG}$—to a value corresponding to the stabilized reference value $V_{STAB}$. Generally, such a function is not necessary for a circuit driving LEDs, but may, however, be useful during start-up of the circuit and during a dimming operation, during which the load current is repeatedly switched on and off in accordance to a pre-defined modulation scheme (e.g., pulse-width modulation, sigma-delta modulation or the like).

Figure 8:
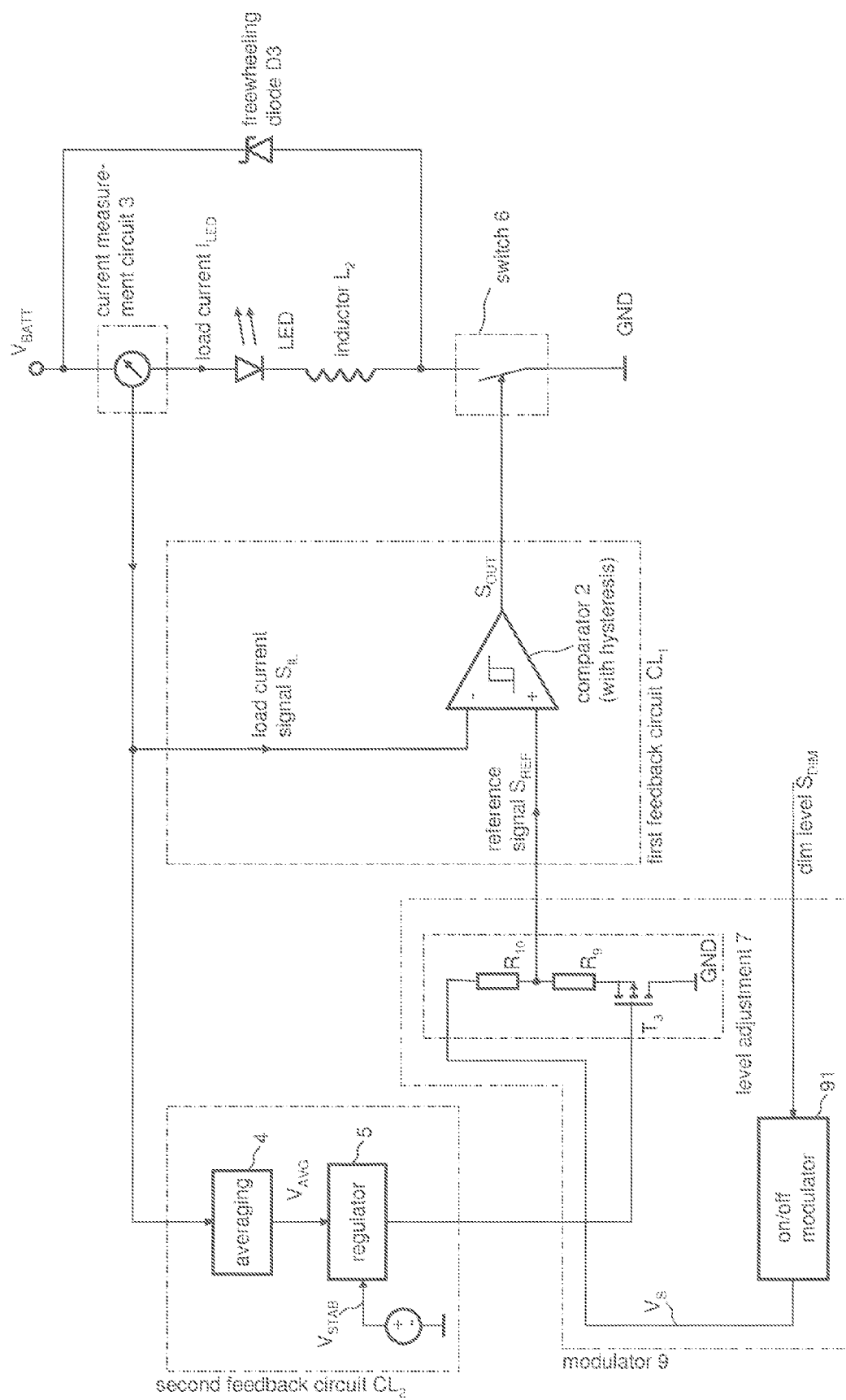
FIG. 8 illustrates the LED driver circuit of FIG. 5*c* in more detail.

The example of FIG. 8 illustrates a LED driver circuit similar to the circuit of FIG. 5c. However, the present example additionally includes a more detailed illustrates of an exemplary level adjusting circuit used in the modulator 9.

As in the previous examples, the filter 4 may be a passive RC filter including the resistor $R_5$ and the capacitor $C_3$. The regulator 5 may include an operational amplifier 51 (see, e.g., FIG. 5c).

In the present example, the level adjusting circuit 7 operates similar to a level shifter. It includes a transistor $T_3$. The transistor $T_3$ is coupled to the output terminal of the regulator 5. The load current path of transistor $T_3$ is connected between the reference potential GND and a resistor $R_9$. A further resistor $R_{10}$ is coupled between the resistor $R_9$ and a terminal for a positive potential $V_S$. The reference signal $S_{REF}$ supplied to the first feedback circuit is tapped at the common circuit node between the two resistors $R_9$ and $R_{10}$. As already mentioned, the level adjustment circuit 7 subjects the reference signal $S_{REF}'$ generated by the regulator 5 (i.e., the control signal) to a level shift in accordance with a defined characteristic curve, which, in the present example is dependent on the characteristics of the transistor $T_3$ and the resistors $R_{10}$ and $R_9$. The level adjustment circuit 7 as illustrated in the present example may be regarded as controllable voltage divider which divides an input voltage $V_S$ (which is provided by the on/off-modulator 91 in the present example) into a fractional voltage $V_S \cdot (R_9 + R_{ON})/(R_9 + R_{10} + R_{ON})$, wherein $R_{ON}$ is the on-resistance of the transistor $T_3$ and thus a function of the reference voltage $S_{REF}'$ provided by the regulator 5 and supplied to the control terminal (i.e., the gate terminal in case of a MOSFET) of the transistor. The middle tap of the voltage divider is the output circuit node of the level adjustment circuit 7 at which the "level adjusted" reference signal $S_{REF}$ is provided, which is a bijective function of the control signal $S_{REF}'$ (i.e., a one-to-one correspondence) provided by the regulator 5. The function depends on the characteristic curves and the resistance values of the resistors $R_9$ and $R_{10}$.

Generally, the function provided by the circuit 7 is adjusting the level of the control signal $S_{REF}'$ provided by the regulator 7 in accordance with a characteristic curve. The controllable voltage divider shown in FIG. 10 has to be regarded as one simple example. A skilled person will have no difficulties achieving the same or a similar function using a difference circuitry (e.g., amplifier circuits or the like). In a digital implementation the characteristic curve may be defined by parameters stored in a memory or by interpolation in a look-up table. However, for low-cost applications a digital solution might be too complex and expensive.

Dimming capability may easily implemented by on/off-modulating the input voltage $V_S$ supplied to the level adjustment circuit 7 in accordance with desired duty cycle (usually expressed in percent). For example, a duty cycle of 30 percent entails that the reference signal $S_{REF}$ is off (e.g., at ground potential, 0V), on average, for 70 percent of the time. For this purpose a modulator 8 is provided that generates the input signal $V_S$ for the level adjustment circuit. Any kind of modulation may be applicable, such as pulse width modulation, pulse frequency modulation, sigma-delta modulation (also referred to as pulse density modulation), various random modulation schemes, etc. It should be noted, that the modulation of the reference signal $S_{REF}$ may also be accomplished in a manner different from the example illustrated in FIG. 7. A skilled person will have no difficulties achieving the same or a similar function using different circuitry. For example the comparator input receiving the reference signal $S_{REF}$ may be tied to ground potential using a switch that is activated and deactivated in accordance with a modulated signal (e.g., provided by the modulator 8) which the input signal $V_S$ is constant.

It should be noted that the filter initialization shown in the example of FIG. 7 may be usefully applied the present example. Compared to the switching frequency of the power semiconductor switch 6 (e.g., in the hundred kilohertz range) the modulation frequency of the modulator 9 is usually much smaller (e.g., below 10 kilohertz). That is, when dimming is active the off-period may be comparably long and, as a consequence the average load current signal $V_{AVG}$ provided by the filter 4 drops. The value of interest provided by the filter is, however, the average load current during the on-phase of the load current. To avoid transient effects such as those seen during a power-on phase of the circuit the filter output is initialized to a value close to the desired average load current signal level $V_{AVG}$ every time the switch 6 is switched on after being off for a "longer" period (i.e., longer than the off-time during "normal" switching operation when the reference signal $S_{REF}$ is not blanked by the modulator 9). For this purpose the initialization unit 81 (see FIG. 7) ignores rising edges occurring in the driver signal $S_{OUT}$ unless it has been low for a given minimum off-time period. This minimum off time may be chosen to fit to the time constant of the filter 4.

Figure 10:
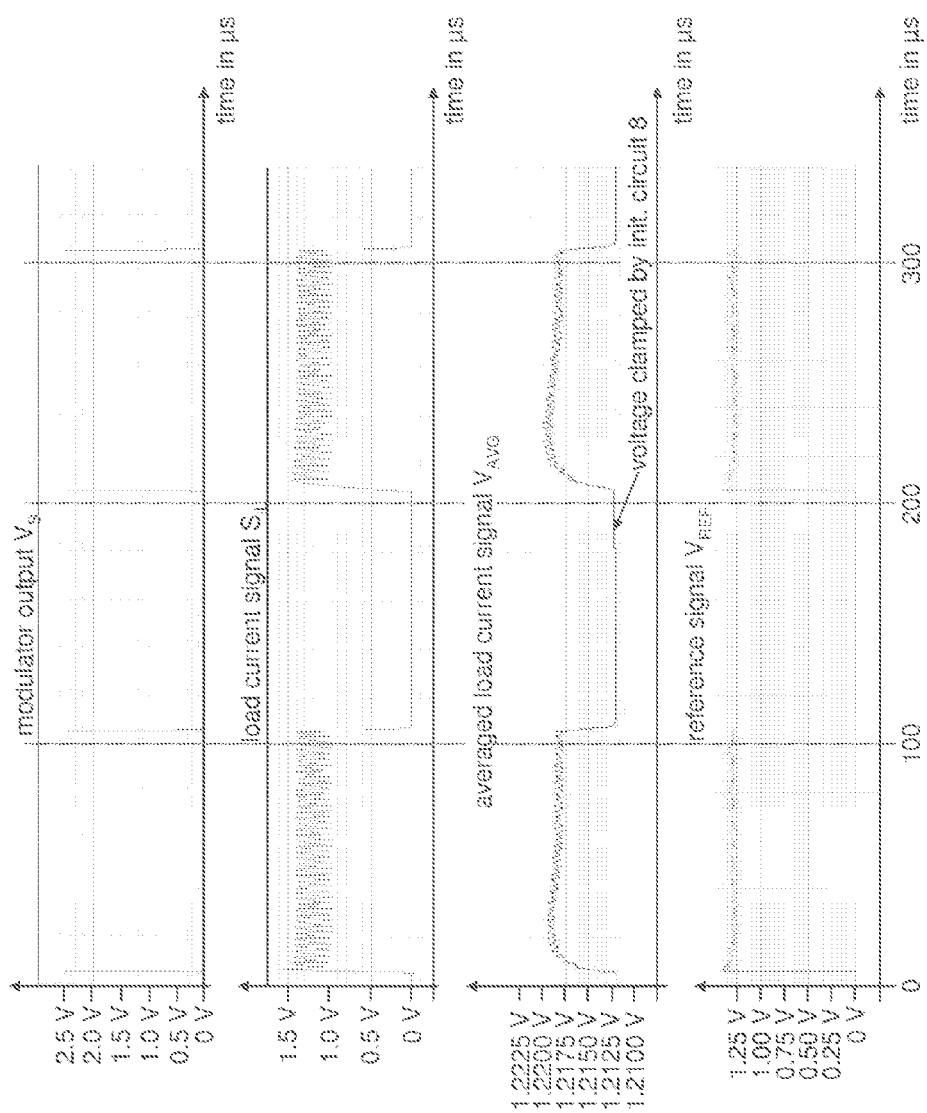
FIG. 10 illustrates the function of the example of FIG. 8 by means of timing diagrams of the relevant signals.

FIG. 10 illustrates waveforms of the modulator output signal (of the on/off modulator 91) for an exemplary duty cycle of 50 percent, the corresponding load current signal $S_{iL}$, the averaged load current signal $V_{AVG}$, and the resulting reference signal $V_{REF}$, which is provided to the first feedback circuit $CL_1$. As mentioned above, the on-off modulator 91 generates an on/off modulated signal which is 0 V or 2.5 V in the present example and has a duty cycle dependent on the dim level $S_{DIM}$ provided to the modulator as input signal. The respective waveform is illustrated in the top diagram of FIG. 10. Second diagram illustrates the corresponding load current signal $S_{iL}$ provided by the current measurement circuit 3 and supplied to the averaging circuit 4 (filter 4, see also FIG. 7). One can see the high frequency switching operation (about 400 kHz switching frequency in the present example) of the power switch 6 during the on-phases of the modulator output signal $V_S$. The third timing diagram illustrates the resulting averaged load current signal $V_{AVG}$ which can be observed at the filter output of filter circuit 4 including the initialization capability described above. During off-phases of the modulator output $V_S$ the filter output signal is clamped to a value close to the desired average value. This clamping significantly reduces the settle time of the filter circuit 4. The bottom diagram of FIG. 10 illustrates the resulting reference signal $V_{REF}$. As already discussed above, the on-level of the reference signal $V_{REF}$ is regulated by the second feedback circuit $CL_2$.

Figure 11:
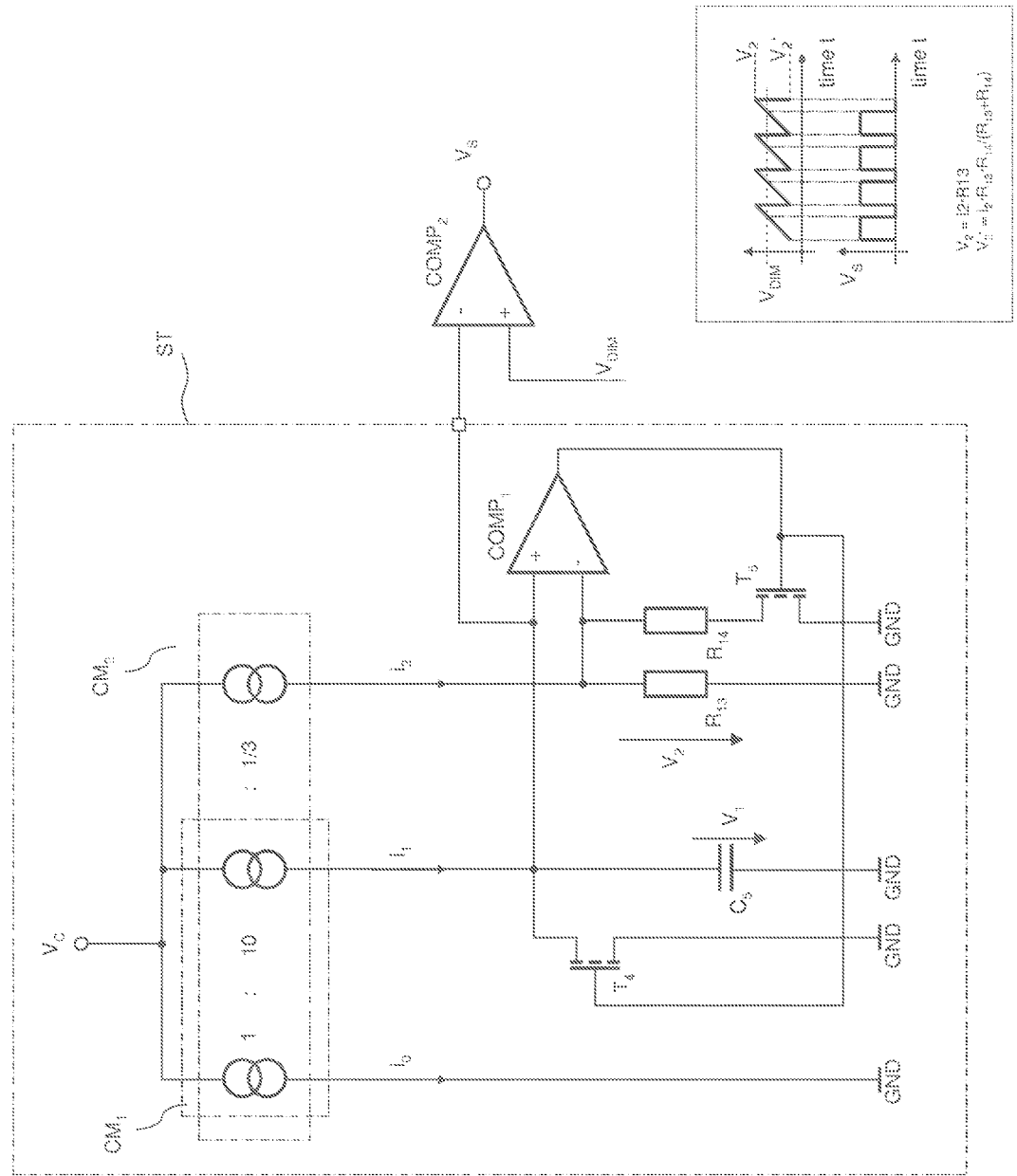
FIG. 11 illustrates one exemplary implementation of the modulator used in the examples described herein.

FIG. 11 illustrates a pulse width modulation generator, which may be used as on/off-modulator 9 or 91 in connection with the examples described above. In known LED drivers, the reference voltage supplied to the comparator 2 (see, e.g., FIG. 5a) can be altered, in order to dim the LED current $I_{LED}$. This method, however, is often imprecise and temperature dependent.

The PWM-modulator circuit shown in FIG. 11 includes a sawtooth generator ST and a comparator $COMP_2$. The sawtooth generator ST includes a first current mirror $CM_1$, a second current mirror $CM_2$ and a comparator $COMP_1$. A capacitor $C_5$ is coupled between the non-inverting input terminal and the output terminal of the comparator $COMP_1$. Further, the capacitor $C_5$ is coupled to the first current mirror $CM_1$ such that it is charged with a constant current $i_1$ which is proportional (in the present example $i_1=i_0/10$) to the current mirror constant input current $i_0$. A transistor $T_4$ is coupled between the non-inverting comparator input of comparator $COMP_1$ and a terminal for reference potential GND. The control terminal (e.g., the gate) of the transistor $T_4$ is coupled to the output of the comparator $COMP_1$. Thus, the capacitor $C_5$ is discharged via the transistor $T_4$ when the comparator output switches to a high level.

A resistor $R_{13}$ is coupled between the second current mirror $CM_2$ and the terminal for reference potential GND. The inverting input terminal of the comparator $COMP_1$ is connected to the common circuit node of the current mirror $CM_2$ and the resistor $R_{13}$. A series circuit of a further resistor $R_{14}$ and a further transistor $T_5$ is coupled in parallel to the resistor $R_{13}$. The transistor $T_5$ switches on and off in accordance with the comparator output signal of comparator $COMP_1$. While the transistor $T_5$ is off the constant current $i_2$ (in the present example $i_2=i_0 \cdot 3$) provided by the second current mirror $CM_2$ passes through the resistor $R_{13}$ thereby creating a voltage drop $V_2=i_2 \cdot R_{13}$ across the resistor $R_{13}$. Thus, the comparator $COMP_1$ switches from a low level to a high level when the (linearly rising) voltage $V_1$ across the capacitor reaches the threshold voltage $V_2$. The non-inverting input terminal of the comparator $COMP_1$ provides the output-signal (sawtooth signal) of the sawtooth-generator which corresponds to the voltage $V_1$ across the capacitor $C_5$.

An externally supplied analogue voltage is transformed into a corresponding PWM-signal $V_S$ by means of this second comparator $COMP_2$. A constant current $i_0$ is converted into a current $i_1$ by means of the first current mirror $CM_1$. This may be a high-side pMOS current mirror, for example. The reference current $i_0$ may be 10 μA, for example. If a 1:10 current mirror is used, the current value of $i_1$ is about 1 μA. The second current mirror $CM_2$ generates a second current $i_2$. The second current mirror $CM_2$ may generate a current $i_2$, which is three times higher than the constant current $i_0$ ($i_2=30$ μA), for example. This current $i_2$ then passes through the resistor $R_{13}$ thereby creating a voltage $V_2$ across the resistor.

Both transistors $T_4$, $T_5$ are not conducting (off) when the comparator output of the comparator $COMP_1$ is low. The capacitance $C_5$ is charged by the current $i_1$ during this time period. When a voltage $V_1$ across the capacitance $C_5$ exceeds the voltage $V_2$, the comparator $COMP_1$ becomes active and switches the two transistors $T_4$, $T_5$ on. The transistor $T_4$ discharges the capacitance $C_5$ abruptly to the value of $V_2$ ($V_2=i_2 \cdot R_{13} \cdot R_{14} \cdot (R_{13}+R_{14})$), as the transistor $T_5$ connects the resistance $R_{14}$ in parallel to the resistance $R_{13}$. The voltage $V_2$ reduces faster than the voltage $V_1$, because the capacitance $C_5$ has to be discharged via the on-resistance of the transistor $T_4$. The switch-off time may be defined by the length to width ratio of the transistor T4.

When the capacitor voltage $V_1$ falls below the voltage $V_2$, the output signal of the comparator $COMP_1$ returns to a low-level and the transistors $T_4$, $T_5$ become non-conductive again. As a result, a voltage $V_2=i_2 \cdot R_{13}$ is supplied again at the inverting input terminal of the comparator $COMP_1$ and the charging of the capacitance $C_5$ starts again.

Within this circuit, it is possible to set the upper threshold value by means of the resistor $R_{13}$ and the lower threshold value by means of the resistor $R_{14}$ (coupled in parallel to the resistor $R_{13}$).

The further comparator $COMP_2$ receives output voltage of the sawtooth generator ST, at a first input terminal and compares it to a reference voltage $V_{DIM}$ which is supplied to the second input terminal. The comparator output switches when the sawtooth voltage reaches the reference voltage $V_{DIM}$. The duty cycle of the PWM signal is proportional to the reference voltage $V_{DIM}$.

Although exemplary embodiments and its advantages have been described in detail, it should be understood that various changes, substitutions and alterations can be made herein without departing from the spirit and the scope of the invention as defined by the appended claims. With the above range of variations and applications in mind, it should be understood that the present invention is not limited by the foregoing description, nor is it limited by the accompanying drawings. Instead, the present invention is limited only by the following claims and their legal equivalents.

Spatially relative terms such as "under," "below," "lower," "over," "upper" and the like are used for ease of description to explain the positioning of one element relative to a second element. These terms are intended to encompass different orientations of the device in addition to orientations different than those depicted in the figures. Further, terms such as "first," "second" and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

What is claimed is:

1. A circuit for driving light emitting diodes, the circuit comprising:
   a first semiconductor switch that is responsive to a driver signal and a freewheeling device coupled between a first supply terminal that provides a supply voltage and a second supply terminal that provides a reference potential;
   an LED and an inductor coupled in series between a common circuit node of the first semiconductor switch and the freewheeling device and either the first supply terminal or the second supply terminal;
   a current measurement circuit coupled to the LED and configured to provide a load current signal that represents a load current passing through the LED;
   a first feedback circuit that comprises an on-off controller configured to receive the load current signal and a reference signal, to compare the load current signal with the reference signal and to generate the driver signal dependent on the comparison;
   a modulator configured to provide, as reference signal, a modulated signal having a desired duty cycle and an amplitude; and
   a second feedback circuit configured to receive the load current signal, to determine an average load current signal and to adjust an amplitude of the modulated reference signal dependent on a difference between the average load current signal and a reference value.

2. The circuit of claim 1, wherein the second feedback circuit comprises:
   a filter coupled to receive the load current signal and to provide a filtered signal representing the average load current; and
   a regulator configured to receive the filtered signal and, as set point value, the reference value, to determine a control signal dependent on a difference between the reference value and the filtered signal in accordance with a predefined control law, and to adjust the amplitude of the modulated reference signal in accordance with the control signal.

3. The circuit of claim 2, wherein the modulator comprises a level adjusting circuit configured to receive the control signal from the regulator, to subject an on/off modulated input signal to a level adjustment dependent on the control signal, and to provide the reference signal.

4. The circuit of claim 3, wherein the level adjusting circuit comprises an amplifier.

5. The circuit of claim 3, wherein the level adjusting circuit comprises a voltage divider having a controllable division ratio, the voltage divider configured to receive the on/off modulated input voltage and to provide a fraction of the input voltage to the first feedback circuit as reference signal, the controllable ratio being responsive to the control signal provided by the regulator.

6. The circuit of claim 3, wherein the input signal is modulated between zero and a peak level corresponding to the signal amplitude, wherein the modulation is one of the following: pulse width modulation, pulse frequency modulation, sigma-delta-modulation, or random on/off modulation.

7. The circuit of claim 3, wherein the modulator is coupled to be supplied with a dim level, and to provide, as the input signal to the level adjustment circuit, a modulated signal having either a zero level or a defined peak level in accordance with a duty cycle that corresponds to the dim level.

8. The circuit of claim 2, wherein the second feedback circuit further comprises an initialization circuit that is configured to initialize the output of the filter to an initial value at or close to the reference value in response to at least one of the following events: a power-on of the circuit; an activation of the first semiconductor switch after being deactivated for a defined minimum time; or a transition from an off-period to an on-period of the modulated reference signal.

9. The circuit of claim 8,
   wherein the initialization circuit comprises a timer circuit and a further switch coupled to the filter; and
   wherein the switch, while activated by the timer unit for a defined time period, connects an output of the filter to an initialization voltage having a voltage level at or close to the reference value thus initializing the filtered signal to the voltage level.

10. An LED driver for driving an LED that is coupled in series with an inductor between a driver output terminal and a first or a second supply terminal, the first supply terminal to carry a supply voltage and the second supply terminal to carry a reference potential, the LED driver comprising:
    a first semiconductor switch and a freewheeling device coupled between the first supply terminal and the second supply terminal, the first semiconductor switch being responsive to a driver signal and a common circuit node between the first semiconductor switch and the freewheeling device being connected to the output terminal;
    a current measurement circuit coupled to the LED, the current measurement circuit configured to provide a load current signal that represents a load current passing through the LED;
    a modulator configured to provide, as reference signal, a modulated signal having a desired duty cycle and an amplitude;
    a first feedback circuit that comprises an on-off controller that is configured to receive load current signal and the reference signal, to compare the load current signal with the reference signal, and to generate the driver signal dependent on the comparison;

a second feedback circuit that comprises a filter and a regulator,
wherein the filter is coupled to receive the load current signal and to provide a filtered signal that represents an average load current, and
wherein the regulator is configured to receive the filtered signal and, as set point value, a reference value, to determine a control signal dependent on the difference between the reference value and the filtered signal in accordance with a predefined control law, and to adjust the amplitude of the reference signal in accordance with the control signal.

11. A method for driving an LED that is coupled in series to an inductor between an output terminal and a first or a second supply terminal, the first supply terminal to carry a supply voltage and the second supply terminal to carry a reference potential, the method comprises:
measuring a load current passing through the LED;
generating a load current signal that represents the load current;
alternately applying either the supply voltage or the reference potential to the output terminal in accordance with a driver signal;
comparing the load current signal with a reference signal;
generating the driver signal dependent on the comparison;
determining an average load current signal, from the load current signal;
generating an on/off modulated input signal having a an off-level, an on-level and a duty cycle; and
adjusting the on-level of the input signal dependent on the average load current signal and a reference value and providing the adjusted signal as reference signal.

12. The method of claim 11, wherein determining the average load current signal comprises:
filtering the load current signal; and
providing a filtered signal as average load current signal.

13. The method of claim 12, wherein determining the average load current signal further comprises initializing the filtered signal to a signal value at or close to the reverence value in response to at least one of the following events: detection of a power-on signal, or detection that the supply voltage is applied to the output terminal after the reference potential has been applied to the output terminal for more than a defined minimum time.

14. The method of claim 12, wherein generating the reference signal comprises:
determining the difference between the filtered signal and the reference value;
generating a control signal dependent on the difference in accordance with a pre-defined control law; and
adjusting the level of the input signal to provide the reference signal.

* * * * *